March 20, 1956 — L. H. FISLER — 2,739,006
KNOB RETAINER
Filed Aug. 9, 1952
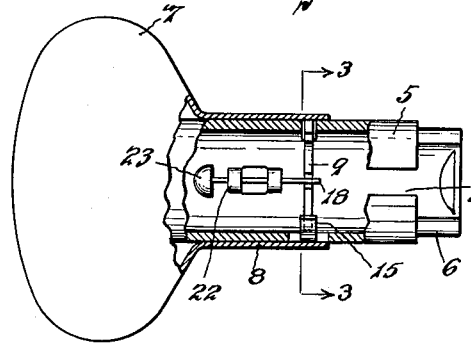
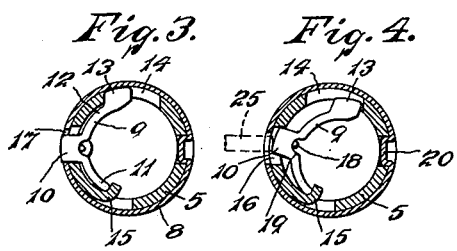
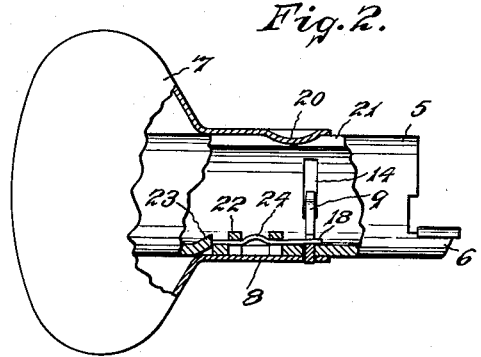
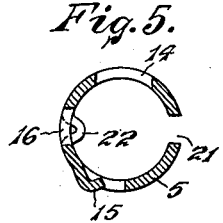
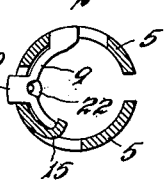
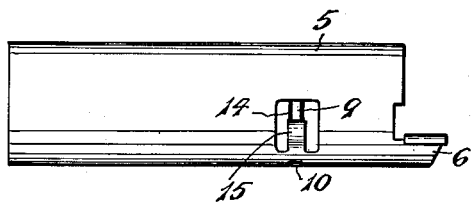
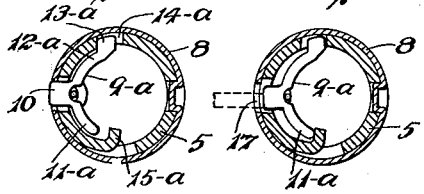
INVENTOR.
LELAND H. FISLER.
BY
Louis V. Lucia
ATTORNEY.

United States Patent Office 2,739,006
Patented Mar. 20, 1956

2,739,006

KNOB RETAINER

Leland H. Fisler, New Britain, Conn., assignor to The American Hardware Corporation, New Britain, Conn., a corporation of Connecticut Application August 9, 1952, Serial No. 303,529

12 Claims. (Cl. 292—352)

This invention relates to a knob retainer and more particularly to a retainer for detachably securing a knob, or other operating member, to the spindle of a cylindrical lock.

An object of this invention is the provision of a retainer which is highly efficient in its operation and extremely economical to produce.

A further object of the invention is the provision of a retainer which may be easily secured to the spindle of a cylindrical lock in such a manner that it will not become accidentally disengaged therefrom.

A still further object of the invention is the provision of improved means for securing the said retainer to the spindle.

A still further object of the invention is the provision of a knob retainer which is carried by the spindle of a cylindrical lock and is constructed in such a manner that it does not interfere with other elements which are insertable into the spindle to provide the cylindrical lock with different locking functions.

Further objects and advantages of this invention will be more clearly understood from the following description and from the accompanying drawings in which:

Fig. 1 is a front view, partly in central horizontal section, of a spindle and knob assembly embodying the present invention.

Fig. 2 is a plan view thereof.

Fig. 3 is a sectional end view, on line 3—3 of Fig. 1, showing the knob retainer in its normal position.

Fig. 4 is a similar view showing the retainer in its disengaged position.

Fig. 5 is a sectional end view of the spindle prior to the assembly of the retainer thereto.

Fig. 6 is a similar view showing the retainer secured in position in said spindle.

Fig. 7 is a plan view of the spindle.

Fig. 8 is a sectional end view showing a modified form of my invention.

Fig. 9 is a similar view showing the retainer in its disengaged position.

In the embodiment of the invention shown in the accompanying drawings, the numeral 5 denotes a spindle of a cylindrical door lock, such as fully described in the co-pending application of Leland Fisler et al., Serial No. 269,168, filed January 31, 1952. The said spindle, as shown, has a rollback portion 6 which is adapted to operate a retractor in the lock mechanism in the manner fully described in the said co-pending application and well known to those skilled in the art.

The operating knob 7 has a tubular shank portion 8 which telescopically receives the spindle, and the present invention is particularly directed to the provision of a retainer for detachably securing the said shank to the spindle against longitudinal movement relatively thereto. The said retainer is denoted by the numeral 9 and is preferably in the form of a flat, narrow, semi-circular member which is stamped from sheet metal and has a finger 10, a fulcrum portion 11 and a securing portion 12 which terminates in a projection 13.

The spindle 5 has an elongated slot 14 in the wall thereof which slidably receives the projection 13 for guiding the retainer and an oppositely disposed hook portion 15 which engages the fulcrum portion 11 and pivotally supports the retainer within the spindle with the finger 10 projecting through a separate opening 16 in said spindle and in position to be received in a retaining opening 17 in the shank 8 of the knob.

A spring member 18 is anchored to the inside of the spindle and extends across the said retainer and through a notch 19 therein and urges the retainer into its normal position, as shown in Fig. 3, wherein the finger 10 thereof is in position to be received in the opening 17 in the shank 8.

It will be noted that the retainer is of a substantially semi-circular form and follows the contour of the spindle so that it clears the central portion of the spindle in order that it may receive other members of the lock mechanism which are not shown.

The shank 8 of the knob has an inwardly extending boss 20 which is slidably received in a longitudinal slot 21 in the spindle and prevents rotation of the knob relatively to the spindle.

The spring 18 is preferably secured to the spindle by means of inwardly extending tabs 22 which are formed in the wall of the spindle, and an abutment 23 is also provided in the said spindle for engaging the end of the spring 18 to locate it relatively to the retainer.

When the spindle 5 is formed, the hook portion 15 is left in the position shown in Fig. 5, wherein the end thereof extends outwardly from the spindle. The retainer member 9 may then be readily assembled to the spindle by inserting it into the spindle and passing the finger 10 through the opening 16. The said hook portion is then forced inwardly, by an external forming operation, and over the end of the fulcrum portion 11 of the retainer, to the position shown in Figs. 3 and 4, thereby rigidly anchoring said retainer in operative position within the spindle and permitting pivotal movement thereof transversely to the axis of the spindle. The spring member 18 is then passed through the loops in the tabs 22 and bent outwardly between said loops, as at 24, to secure it to the spindle against longitudinal movement.

When the knob 7 is to be assembled to the spindle, the finger 10 of the retainer is forced inwardly, and the shank 8 of the knob is passed over the spindle until the said finger registers with the opening 17 in the shank of the knob. The spring 18 will then force the finger 10 through the said opening 17 to thereby secure the knob against longitudinal movement on the spindle. Rotational movement of the knob on the spindle will be prevented by the boss 20 which projects into the slot 21 in the spindle.

When it is desired to detach the knob from the spindle, the retainer 9 is forced inwardly against the tension of the spring 18, preferably by a suitable implement as illustrated in dotted lines at 25, until the said finger disengages the shank. The knob may then be pulled outwardly and detached from the spindle. As illustrated in Fig. 4, the said retainer is held against detachment from the spindle by abutment means provided by the hook 15 and by the end of the elongated slot 14 which provides an abutment for the projection 13 of the retainer and thereby confines the retainer within the openings 14 and 16 in the spindle. The retainer is held in engagement with the hook portion 15 by engagement of the finger 10 with the end of the opening 16, as shown in Fig. 4, and it is thereby movably secured in the spindle by simply forcing the hook portion 15 from the position in which it is shown in Fig. 5 to that in which it is shown in Figs. 3, 4 and 6.

In the modified form illustrated in Figs. 8 and 9, the elongated slot 14–a is made shorter than the slot 14 and the retainer member 9–a is formed so that the portion 12–a thereof will act as the fulcruming portion and the projection 13–a will extend into the said slot 14–a as shown. The portion 11–a will act as the securing portion to retain the retainer in the spindle by abutting the inwardly extending hook portion 15–a.

When the retaining finger 10–a is forced inwardly, as shown in Fig. 9, the portion 12–a will abut and pivot on the side of the slot 14–a and cause the retainer to swing inwardly until the end of the portion 11–a engages the hook 15–a. The retainer is then out of engagement with the shank 8 of the operating knob.

It will be understood from the above description that my invention provides a highly durable and efficient knob retainer and means for attaching it to the spindle which may be produced by simple stamping operations and thereby enabling the manufacture of the retainer and spindle in a highly economical manner.

I claim:

1. Means for detachably securing an operating member to a tubular spindle comprising a retainer member contained within the spindle and movable in a direction transversely of the longitudinal axis thereof, a finger projecting radially from said retainer through an opening in the spindle and adapted to engage said operating member, spring means normally urging said retaining member into retaining position, a projection extending from one end of said retainer member into an elongated slot in the wall of said spindle for guiding said retainer member, a hook shaped portion projecting into the spindle opposite said elongated slot; the side of said elongated slot and said hook shaped projection providing abutment means engageable by the opposite ends of said retainer member for limiting the inward movement thereof.

2. Means for detachably securing an operating member to a tubular spindle comprising a retainer member contained within the spindle and movable in a direction transversely of the longitudinal axis thereof, a finger projecting radially from said retainer through an opening in the spindle and adapted to engage said operating member, spring means normally urging said retainer member into retaining position, a projection extending from said retainer member into an elongated slot in the wall at one side of the spindle, and a hook shaped portion struck from and extending inwardly of the wall of the spindle opposite said slot wherein it is engaged by the adjacent end of said retainer for limiting the inward movement thereof.

3. A construction for detachably securing an operating member to a tubular spindle comprising a retainer member contained within the spindle and having a finger portion projecting through an opening in the spindle and adapted to engage the operating member, means urging said retainer member into retaining position, means in said spindle providing abutments at the opposite sides of said opening; one end of said retaining member being adapted to engage the abutment adjacent thereto to pivotally mount the retaining member in the spindle and the other of said abutments providing a stop which is engageable by the opposite end of said retaining member for limiting its inward movement relatively to the spindle.

4. A construction for detachably securing an operating member to a tubular spindle comprising a retainer member of substantially semi-circular configuration having a finger portion extending radially from its outer edge through an opening in the spindle and adapted to engage the operating member, spring means urging said member into retaining position, means formed in the wall of said spindle providing abutments at the opposite sides of said opening; one end of said retainer being engageable with the abutment adjacent thereto to pivotally mount the retainer member in said spindle and the opposite abutment being engageable by the opposite end of said retainer member to limit the inward movement thereof relatively to the spindle.

5. A construction for detachably securing an operating member to a tubular spindle, the said construction comprising a substantially semi-circular retainer member contained within the spindle and having a finger extending radially from its outer edge through an opening in the spindle and adapted to engage the operating member, a projection extending from one end of said retainer member into an opening in the spindle and engageable with a side of said opening for pivotally mounting the retainer member therein, separate abutment means engageable by said retainer member to limit its inward movement relatively to the spindle, and spring means normally urging said retainer member into normal position wherein said finger is in engagement with the operating member.

6. A construction for a retainer for detachably securing an operating member to a tubular spindle, the said construction comprising a substantially semi-circular flat retainer member contained within said spindle, an inwardly extending projection on said spindle adapted to receive an end portion of said retainer member and thereby pivotally support it within the spindle, a finger on said retainer member extending through an opening in the spindle, spring means normally urging said retainer member into retaining position, and a projection on said retainer member projecting into a separate opening in the spindle for limiting the pivotal movement of the retainer therein and thereby preventing disengagement of the retainer from the spindle.

7. A retainer construction for detachably securing an operating member to a tubular spindle, the said construction including a substantially flat semi-circular retaining member having a finger projecting from an intermediate portion thereof, a fulcruming extension at one end and a projection at its opposite end, an inward projection on the spindle for engaging the end of the fulcruming extension of the retainer and pivotally supporting it within the spindle, the said spindle having an opening therein receiving the finger and a separate opening receiving the projection on the retainer, spring means normally urging said retainer into retaining position; the said separate opening limiting the pivotal movement of the retainer to thereby prevent withdrawal of the finger from its respective opening in the spindle to thereby secure the retainer member to the spindle.

8. A retainer construction for detachably securing an operating member to a tubular spindle, the said construction including a hook portion extending inwardly into said spindle, an elongated opening in the wall of the spindle substantially opposite the said hook portion, a separate opening in said wall intermediate the hook portion and the elongated opening, a substantially flat semi-circular retainer member having an extension fitting within said hook portion and pivotally mounting the retainer member within said spindle, a finger projecting from said retaining member through said separate opening, spring means normally urging said retainer into retaining position, and a projection on said retainer member projecting into said elongated opening and adapted to abut an end of said opening to limit the pivotal movement of the retainer member and prevent disengagement of the finger from the said separate opening and thereby prevent detachment of the retainer member from the spindle.

9. A retainer construction for detachably securing an operating member to a tubular spindle, the said construction comprising a hook portion extending inwardly into the spindle, a substantially flat semi-circular retainer member contained within said spindle and supported in said hook portion for pivotal movement transversely to the axis of the spindle, a finger projecting from said retainer member through an opening in the spindle for engaging and retaining the operating member against movement longitudinally to the spindle, spring means in said spindle normally urging said retainer into retaining position, a projection on said retainer member extending into an elongated opening in said spindle substantially opposite the said hook portion and thereby limiting the pivotal movement of the retainer member to prevent disengagement of the finger from its respective opening in the spindle and thereby prevent detachment of the retainer member from the spindle, and means for preventing rotational movement of the operating member on the spindle.

10. A construction for a retainer as set forth in claim 9 wherein said spring means includes a spring member anchored to the spindle and normally urging the retainer member to project the finger thereon through its respective opening in the spindle.

11. A retainer construction as set forth in claim 9 wherein said spring means includes spaced loops extending inwardly in the spindle, a spring member extending through said loops and secured thereby to the spindle, the said spring member normally urging the retainer member to project the finger thereon through its respective opening in the spindle and being bent between the said loops to prevent longitudinal movement of the spring member within the spindle.

12. A construction for a retainer for detachably securing an operating member to a spindle, the said construction comprising a substantially semi-circular flat retainer member contained within the spindle, a projection on said retainer member extending into an opening in the spindle and engageable with a side of said opening for pivoting the retainer member, a separate projection on said retainer member engageable with an inwardly extending abutment on said spindle for limiting the pivotal movement of the retainer member, a retaining finger extending from the retainer member intermediate the said projections through a separate opening in the spindle, and spring means normally urging the said retaining finger into position wherein it extends through said separate opening.

References Cited in the file of this patent

UNITED STATES PATENTS

| | | |
|---|---|---|
| 1,621,174 | Schlage | Mar. 15, 1927 |
| 2,369,494 | Schlage | Feb. 13, 1945 |